April 28, 1970 D. D. ROSS 3,508,356

INFORMATION CARD

Filed Jan. 2, 1968

INVENTOR
Daniel D. Ross

BY
Lane, Aitken, Dunner & Ziems
ATTORNEYS

United States Patent Office 3,508,356
Patented Apr. 28, 1970

3,508,356

INFORMATION CARD

Daniel D. Ross, 305 Arterburn Road,
Louisville, Ky. 40222

Filed Jan. 2, 1968, Ser. No. 694,623
Int. Cl. G09f *7/18*
U.S. Cl. 40—129 3 Claims

ABSTRACT OF THE DISCLOSURE

A plastic information card having windows on a face thereof for recording related items of information, and magnetic tape on the other face thereof for magnetically retaining the card on a metal surface of an object bearing a relation to the information on the card.

BACKGROUND OF THE INVENTION

The present invention relates to cards for storing related items of information, and more particularly to a plastic card having spaces defined on one face thereof for recording related items of information directly on the surface of the card.

In connection with automotive maintenance, it is difficult for the operator of a vehicle to keep track of the various details involved, such as, the mileage at which the oil, oil filter and air cleaner are to be changed, the mileage or time for the next lubrication, and so forth. Most service stations do have a slip of paper on which much of this information is to be recorded by the service station attendant at the time of servicing. Normally the paper is filled out and adhesively bonded to the frame of the car door after the work has been completed. However, this often is not done, or the slip of paper is not completely filled out, and in general this system is not convenient or satisfactory for the operator of the vehicle.

SUMMARY OF THE INVENTION

In accordance with a preferred embodiment of the present invention, a plastic card is provided having a plurality of spaces on one face thereof in which the operator of a vehicle can write in the mileage, date or other information pertinent to the maintenance item identified by a legend associated with the space. Spaces are provided for all of the important maintenance items, and additional spaces may be provided for other relevant information, such as, the type of oil to be used, the tire pressure, and so forth. Magnetic tape is secured to the opposite face of the card to enable the card to be magnetically retained in a convenient position within the car, such as on the inside of the glove compartment door.

The card is designed to be filled out by the operator with the mileage or date each of the various items are to be attended to, as well as the other information called for by the card. The spaces relating to items which must be attended to at a certain mileage or date have a smaller space associated therewith for receiving a check mark to be recorded by the operator when the date or mileage is reached. When the driver takes the car in for servicing, the check marks indicate the various items requiring service at that time. Although the card is particularly suited for use in connection with automotive maintenance, the items of information to be recorded thereon can be varied to suit many other applications.

The features of novelty of the present invention will be specifically pointed out or will otherwise become apparent when referring, for a better understanding of the invention, to the following description taken in conjuction with the accompanying drawings.

DESCRIPTION OF THE PREFERRED EMBODIMENT

Figure 1:
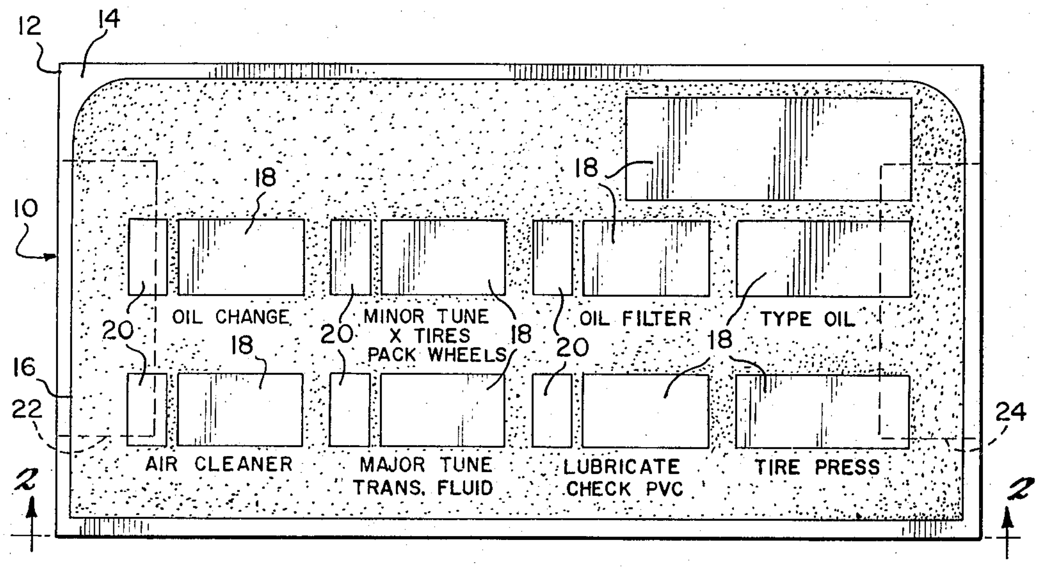
FIG. 1 is a view of one face of a card illustrating one embodiment of the invention.
Figure 2:
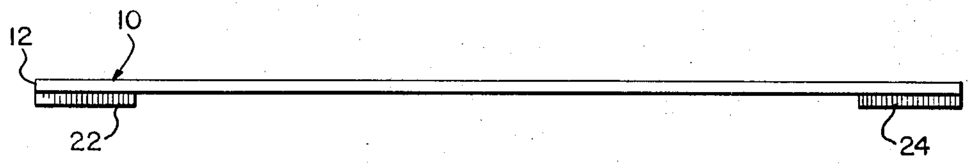
FIG. 2 is a view of one edge of the card of FIG. 1.

Referring to FIGS. 1 and 2, an information card 10 is illustrated for recording information relating to the maintenance of an automotive vehicle. The information card 10 comprises a flat, rectangular body 12 preferably made of a suitable plastic material stiff enough to provide a good writing surface without having to place something behind it. It is also preferred that the plastic material have a white or other light color so that information can be written directly thereon by pen or pencil in a manner to clearly stand out. Writing directly on the plastic enables the information to be erased many times without damaging the surface. Alternatively, the card could be made out of a plastic material which is not suitable for writing, and one or both faces of the card treated or coated to provide a good writing surface which will withstand erasures.

The face 14 of the body 12 is painted with a decorative coating 16 in a manner to define windows 18 for recording the items of information. In addition, some of the windows 18 have smaller windows 20 adjacent thereto for a purpose to be described. Since the surface of the windows 18 and 20 is formed by the face 14 of the body 12 and not by the decorative painted coating 16, the aforementioned writing surface which can withstand erasures is provided in a simple and economical manner.

Each of the windows 18 with the exception of the largest window in the upper corner of the card has a suitable legend associated therewith describing the information to be recorded in the window. In using the card, the operator of the vehicle can record in the windows 18 having the smaller windows 20 associated therewith, the mileage or date at which the various items are to be attended to. When the mileage or date is reached for a particular item, the operator can insert a check mark in the window 20 associated therewith. The car can be taken in for servicing at that time or the operator can wait until additional items are checked so that all of these can be serviced at the same time. Thus, at any given time, the card functions as a quick reminder of the items ready for servicing and when the remaining items will be ready for servicing.

The large window in the upper right corner of the card is left without a legend so that it can be used for miscellaneous information. If the card 10 is distributed to customers as a courtesy by an oil company, the name of the company could be inserted in this window. The space to the left of this window can be used for advertising or other purposes.

Magnetic tapes 22 and 24 are adhesively bonded to the back face of the body 12 along the edges thereof to magnetically retain the card in a convenient position inside the automotive vehicle to which the service information applies. For example, the card can be retained on the inside of the glove compartment door or in some other position on the dashboard. The space on the back face of the card between the magnetic tapes 22 and 24 can be used for recording additional miscellaneous information.

Cards to be used for other than automotive maintenance purposes, would have appropriate legends beneath the windows to designate the items of information involved. A good example of an alternative use for the card would be for recording various items stored in a refrigerator that must be replaced from time to time, or items that are perishable and must be used within a limited period of time. The magnetic tape will retain the card on the refrigerator itself so that it is accessible for use at all times.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. An information card comprising a flat body having opposed faces, at least one of said faces providing a writing surface suitable for information to be recorded thereon by a writing instrument, an uninterrupted non-erasable coating on said one face defining a plurality of spaced windows through which said one face is exposed for contact by the writing instrument, said body being sufficiently stiff to enable information to be written on said one face by the writing instrument without additional support, and a legend associated with and identifying the information to be recorded in said windows, said legends forming part of a group of related information.

2. A card as defined in claim 3 wherein said body is made out of a plastic material which inherently provides a suitable writing surface.

3. A card as defined in claim 1 including a pair of strips of magnetic tape adhesively bonded to the other of said faces in parallel spaced apart relation for magnetically retaining said card on a metal surface.

References Cited

UNITED STATES PATENTS

| | | | |
|---|---|---|---|
| 784,969 | 3/1905 | Wikoff | 35—66 X |
| 876,948 | 1/1908 | Dexter | 35—66 X |
| 2,120,673 | 6/1938 | Meadows | 35—66 |
| 2,556,825 | 6/1951 | Smith | 35—66 X |
| 3,150,296 | 9/1964 | McIntosh. | |
| 3,195,022 | 7/1965 | Staver | 281—44 |
| 3,237,327 | 3/1966 | Griggs. | |

FOREIGN PATENTS

| | | |
|---|---|---|
| 342,471 | 2/1931 | Great Britain. |

EUGENE R. CAPOZIO, Primary Examiner

W. J. CONTRERAS, Assistant Examiner

U.S. Cl. X.R.

35—66; 40—2